(12) United States Patent
Kobayashi et al.

(10) Patent No.: US 6,976,481 B2
(45) Date of Patent: Dec. 20, 2005

(54) VEHICLE-MOUNTED INTERNAL COMBUSTION ENGINE

(75) Inventors: Hajime Kobayashi, Fujisawa (JP); Atsushi Konno, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/659,251

(22) Filed: Sep. 11, 2003

(65) Prior Publication Data
US 2004/0060549 A1    Apr. 1, 2004

(30) Foreign Application Priority Data
Sep. 26, 2002 (JP) .............................. 2002-281171

(51) Int. Cl.[7] ............................................. F02M 25/07
(52) U.S. Cl. ............................. 123/568.12; 123/568.21
(58) Field of Search ...................... 123/568.11, 568.12, 123/568.21, 550, 551; 60/278, 279, 605.2

(56) References Cited

U.S. PATENT DOCUMENTS

| | | | |
|---|---|---|---|
| 4,177,641 A * | 12/1979 | Wakita et al. ................. | 60/278 |
| 5,592,925 A * | 1/1997 | Machida et al. ........ | 123/568.11 |
| 6,273,073 B1 * | 8/2001 | Suzuki ........................ | 123/550 |
| 6,659,090 B2 * | 12/2003 | Sisken .................... | 123/568.11 |
| 2002/0078935 A1 * | 6/2002 | Opris ..................... | 123/568.11 |

FOREIGN PATENT DOCUMENTS

JP    2737412    1/1998

* cited by examiner

Primary Examiner—Willis R. Wolfe, Jr.
(74) Attorney, Agent, or Firm—Staas & Halsey LLP

(57) ABSTRACT

An vehicle-mounted internal combustion engine (1) provided with an EGR line (11) for recirculating exhaust gas, an EGR valve (12) which is arranged in said EGR line (11) and controls an EGR amount, and an EGR controller (41), is constituted so that said EGR controller (41) opens said EGR valve and performs control for scavenging said EGR line (11) at the time of reducing vehicle speed and during idling.

With this vehicle-mounted internal combustion engine (1), the sulfuric acid corrosion can be avoided by preventing condensation of moisture in the exhaust gas in the EGR line (11), the EGR valve (12), etc. developed when the internal combustion engine (1) stops running.

4 Claims, 2 Drawing Sheets

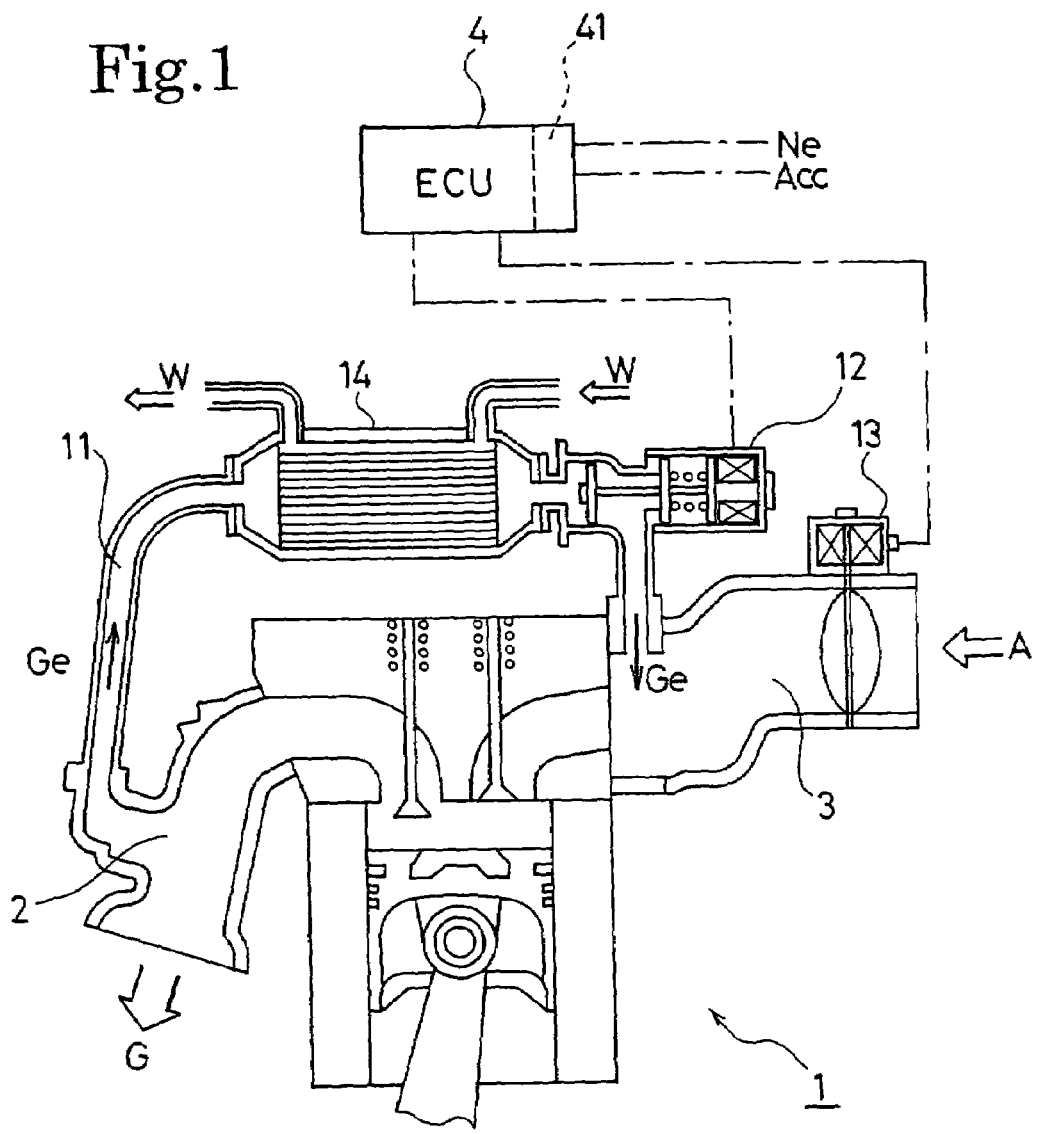

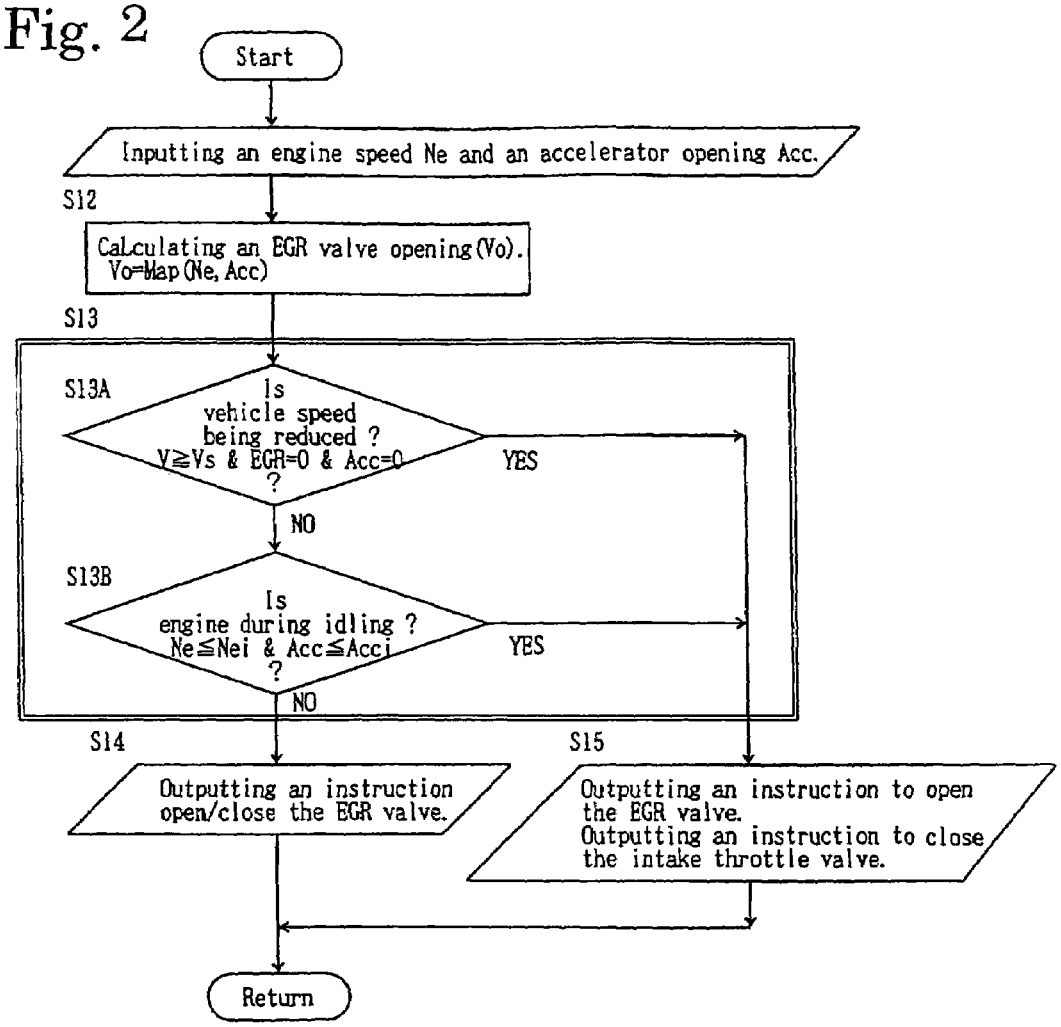

VEHICLE-MOUNTED INTERNAL COMBUSTION ENGINE

BACKGROUND OF THE INVENTION

This invention relates to a vehicle-mounted internal combustion engine provided with an EGR (exhaust gas recirculation) system.

In the internal combustion engines such as gasoline engines and Diesel engines, EGR recirculating the exhaust gas is carried out in order to reduce NOx in the exhaust gas. For this EGR, an EGR line having an EGR valve at a mid-point for controlling an EGR amount is arranged branching from the exhaust line and joining to the intake line. Moreover, an EGR controller for controlling this EGR valve is also arranged.

An internal combustion engine performing this EGR has a problem of sulfuric acid corrosion caused by the EGR gas confined in the EGR line when the operation of the internal combustion engine is stopped.

Namely, when the operation of the internal combustion engine is stopped, since high temperature EGR gas containing moisture are confined in the EGR line, the contained moisture is condensed when the internal combustion engine is cooled and the EGR gas is cooled. Then, the condensed water adheres to the EGR line, the EGR valve, etc. Since the condensed water reacts with sulfur content in the exhaust gas to form sulfuric acid, the EGR piping, the EGR valve, etc. are corroded with this sulfuric acid.

In order to cope with this, an EGR valve anticorrosion system described in the conventional Patent Publication 2737412 (page 2), although this is suitable for an internal combustion engine using an alcohol fuel, forcibly makes the EGR valve open by interlocking it with the ignition key of the engine when the engine comes to a halt state from an operational state.

However, in order to correspond to the reinforcement of emission gas control in recent years, the EGR amount is increased for promoting an effect of NOx reduction, and condensed water formed in the EGR line is also increased in the amount associated therewith. Therefore, there is a problem that the corrosion cannot fully be coped with by controlling the EGR valve to be open only when the ignition key is turned off.

Moreover, thanks to the widespread use of idling stop systems, it has become necessary to prevent the condensed water from being formed by scavenging the EGR line also before or after the idling stop. However, since this idling stop is not always interlocked with the ignition key, there is another problem that the corrosion problem cannot fully be coped with by open-control of the EGR valve only at the time of key-off.

BRIEF SUMMARY OF THE INVENTION

This invention has been performed in order to solve the above-mentioned problem, and the purpose is to provide a vehicle-mounted internal combustion engine capable of avoiding the sulfuric acid corrosion by preventing condensation of moisture in the exhaust gas generated in the EGR piping, the EGR valve, etc. at the time of halting the operation of the internal combustion engine.

The vehicle-mounted internal combustion engine to achieve the purpose as the above is provided with an EGR line for recirculating exhaust gas, an EGR valve for controlling an EGR amount, and an EGR controller for controlling the EGR valve, and is so constituted that said EGR controller performs scavenging control of said EGR line by opening said EGR valve at the time of reducing the speed of the vehicle.

According to this constitution, when the vehicle is decreased in speed, the EGR line is scavenged with the exhaust gas lowered in temperature by speed reduction by opening the EGR valve for a few seconds to a few minutes. Therefore, since the water amount in the exhaust gas is made low even if the EGR gas remaining in the EGR piping arranged in the EGR line, the EGR valve, the EGR cooler, etc. are cooled down after halt operation of the internal combustion engine, condensed water and sulfuric acid can be avoided from forming.

Moreover, in the vehicle-mounted internal combustion engine provided with the EGR line for recirculating exhaust gas, the EGR valve which is arranged in said EGR line and controls the EGR amount, and the EGR controller for controlling said EGR valve, said EGR controller is constituted so as to perform control of scavenging said EGR line by opening said EGR valve at idle engine operation.

According to this constitution, at idle engine operation, the EGR line is scavenged with the exhaust gas lowered in temperature by speed reduction by opening the EGR valve for a few seconds to a few minutes. Therefore, since the water amount in the exhaust gas is made low even if the EGR gas remaining in the EGR piping arranged in the EGR line, the EGR valve, the EGR cooler, etc. are cooled down during idle operation and after halt operation of the internal combustion engine, condensed water and sulfuric acid can be avoided from forming.

Further, the above-mentioned EGR controller is provided with an intake throttle valve for controlling a suction air amount in the suction line of the internal combustion engine, and is also constituted so that said EGR controller performs control of closing said intake throttle valve up to a predetermined opening at the time of scavenging said EGR line.

According to this constitution, since the intake throttle valve is closed up to the predetermined opening at the time of scavenging the EGR line, scavenging of the EGR line is promoted, and this improves an effect of preventing condensed water and sulfuric acid from being formed.

Therefore, according to the vehicle-mounted internal combustion engine of the present invention, the EGR line is scavenged with the exhaust gas lowered in temperature by opening the EGR valve for a few seconds to a few minutes at reduced speed and idle operation of the vehicle, therefore, even if the EGR gas remaining in the EGR piping arranged in the EGR line, the EGR valve, the EGR cooler, etc. are cooled down, the water content in the exhaust gas is made low, and as a result, the condensed water and sulfuric acid can be avoided from forming and sulfuric acid corrosion can be prevented.

BRIEF DESCRIPTION OF THE DRAWINGS

FIG. 1 is a drawing illustrating the constitution of the vehicle-mounted internal combustion engine in an embodiment relating to the present invention.

FIG. 2 is a flow diagram showing an example of the EGR control in the EGR controller of the vehicle-mounted internal combustion engine relating to the present invention.

BRIEF DESCRIPTION OF THE INVENTION

In the following, an embodiment of the vehicle-mounted internal combustion engine relating to the present invention will be explained referring to the drawings.

As illustrated in FIG. 1, this vehicle-mounted internal combustion engine (engine) 1 is constituted comprising an ERG line 11 for recirculating a part Ge of the exhaust gas G, an ERG valve 12 for controlling an EGR amount, and an EGR controller 41 for controlling this EGR valve 12. This EGR line 11 provides communication between the exhaust line 2 and the air intake line 3. Moreover, the EGR valve 12 is arranged in the EGR line 11, and is further provided with an EGR cooler 14 for cooling the EGR gas Ge with cooling water W. In the intake air line 3, an intake throttle valve 13 for controlling a volume of an intake air A is arranged.

Then, a controller 4 called an engine control unit (ECU) for controlling the operation of the internal combustion engine 1 is arranged, and the EGR controller 41 is built in this controller 4.

This EGR controller 41 receives data of engine speed Ne, accelerator opening Acc, etc., and is constituted so as to control opening and closing the EGR valve 12 and the intake throttle valve 13, and adjusting their openings.

This EGR controller 41 calculates an opening of the EGR calve 12 from the engine speed Ne and the accelerator opening Acc according to pre-inputted EGR map data at normal operation of the engine, to control the EGR valve 12 to this opening.

Then, according to the present invention, the EGR controller 41 is further constituted so as to perform control for scavenging the EGR line 11 by opening the EGR valve 12 at the time of reducing the vehicle speed, control for scavenging the EGR line 11 by opening the EGR valve 12 during idling, control for closing the intake throttle valve 13 to a predetermine opening when these control for scavenging the EGR line 11 are performed.

This control is performed according to the EGR control flow as shown in FIG. 2. For a brief explanation, this EGR control flow is repeatedly called from the main control flow for engine operation, and is shown as an example to be performed in parallel with the main control flow.

When the EGR control flow at FIG. 2 starts, the engine speed Ne and the accelerator opening Acc are inputted thereto at the step S11. At the step S12, the EGR controller refers to the pre-inputted EGR map data (Map) and calculates a valve opening Vo of the EGR valve corresponding to the inputted engine speed Ne and accelerator opening Acc. At the next step S13, it is judged whether or not the EGR line is in a scavenging condition.

As for this judgment at the step S13, it is judged at the step S13A whether or not the vehicle speed is being reduced, namely, it is judged whether or not the three conditions that the vehicle speed V is at a predetermined vehicle speed Vs or higher; the EGR is in the OFF state (the opening of the EGR valve 12 is zero); and the accelerator is in the OFF state (the accelerator opening Acc is zero), are satisfied at the same time. Further, at the step S13B, it is judged whether or not the engine is in the state of idling, namely, whether or not the engine speed Ne is at a predetermined engine speed Nei or lower and the accelerator opening Acc is also at a predetermined opening Acci or smaller.

At the step S13, if the engine is neither in the state of vehicle speed reduction nor at idling state, and does not correspond to the scavenging conditions of the EGR line, an instruction is outputted to the EGR valve 12 to be opened up to this calculated valve opening Vo at the step S14. When this valve opening Vo is zero, the EGR valve 12 is closed up and the EGR is not performed. When this valve opening Vo is not zero, the EGR valve 12 is opened up to the opening Vo, and the EGR is performed with the EGR amount according to the valve opening Vo.

Moreover, in this state, the intake throttle valve 13 is controlled according to the main control.

Then, at the step S13, if the engine corresponds to either of the scavenging conditions that it is in the vehicle speed reduction state and the idling state, the controller outputs, at the step S15, an instruction to open the EGR valve 12 for a predetermine period (for example, a few seconds to a few minutes), and an instruction to close the intake throttle valve 13 to a predetermined opening of the valve.

After having executed this step S14 or the step S15, this EGR valve control flow returns, and is repeatedly re-called from the main control flow after return, and is repeatedly executed during operation of the internal combustion engine. Then, this EGR valve control flow is also ended together with the end of the main control flow accompanying a halt of the engine operation.

According to the above constitution, the EGR gas Ge containing much moisture content at high temperature having remained in the EGR line 11 during running can be replaced with the EGR gas Ge with less moisture content at low temperature when the accelerator is OFF, by scavenging the EGR line 11 at the time of reducing the vehicle speed and idling state. Moreover, even if the EGR gas Ge which has remained in the EGR line 11, EGR valve 12, EGR cooler 14, etc. is cooled after the internal combustion engine is halted, condensed water and sulfuric acid can be avoided from forming, and they are kept from sulfuric acid corrosion.

Moreover, since the intake throttle valve 13 is controlled in the closing direction when scavenging the EGR line 11, this promotes the scavenging of the EGR line, and further improves a prevention effect of producing the condensed water and sulfuric acid.

What is claimed is:

1. A vehicle-mounted internal combustion engine comprising:
    an EGR line for recirculating exhaust gas;
    an EGR valve is arranged in the EGR line to control an EGR amount;
    an EGR controller for controlling the EGR valve, wherein said EGR controller performs control of scavenging said EGR line by opening said EGR valve at a time of reducing vehicle speed;
    an intake line; and
    an intake throttle valve for controlling an intake air volume in the intake line, wherein said EGR controller performs control of closing said intake throttle valve up to a predetermined opening at a time of scavenging said EGR line.

2. A vehicle-mounted internal combustion engine comprising:
    an EGR line for recirculating exhaust gas;
    an EGR valve in the EGR line to control an EGR amount;
    an EGR controller for controlling the EGR valve, wherein said EGR controller performs control of scavenging said EGR line by opening said EGR valve during idling;
    an intake; and
    an intake throttle valve for controlling an intake air volume in the intake line, wherein said EGR controller performs control of opening said intake throttle valve up to a predetermined opening at the time of scavenging said EGR line.

3. An internal combustion engine mounted in a vehicle comprising:
   an EGR line for recirculating exhaust gas;
   an EGR valve arranged in the EGR line for controlling an EGR; and
   an EGR controller for controlling the EGR valve,
   wherein the EGR controller carries out a judgment as to whether the engine is in a scavenging condition, and if judged that the engine is in the scavenging condition, performs control to open the EGR valve, whereby the EGR line is scavenged and a high-temperature exhaust gas having a relatively high moisture content is replaced with a low-temperature exhaust gas having a relatively small moisture content,
   wherein said scavenging condition is a decelerated vehicle condition with an accelerator of the vehicle put to OFF.

4. An internal combustion engine mounted in a vehicle comprising:
   an EGR line for recirculating exhaust gas;
   an EGR valve arranged in the EGR line for controlling an EGR; and
   an EGR controller for controlling the EGR valve,
   wherein the EGR controller carries out a judgment as to whether the engine is in a scavenging condition, and if judged that the engine is in the scavenging condition, performs control to open the EGR valve, whereby the EGR line is scavenged and a high-temperature exhaust gas having a relatively high moisture content is replaced with a low-temperature exhaust gas having a relatively small moisture content,
   wherein said scavenging condition is an idling engine operation condition.

* * * * *